(12) United States Patent
Parge

(10) Patent No.: US 6,378,418 B1
(45) Date of Patent: Apr. 30, 2002

(54) CONNECTING ROD ASSEMBLY FOR HIGH PRESSURE INJECTION PUMPS

(75) Inventor: Phillip D. Parge, Sour Lake, TX (US)

(73) Assignee: Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/166,324

(22) Filed: Oct. 5, 1998

Related U.S. Application Data

(60) Provisional application No. 60/061,141, filed on Oct. 6, 1997.

(51) Int. Cl.$^7$ ............................. F01B 9/00; F01B 31/00; F16J 15/18
(52) U.S. Cl. ..................... 92/140; 92/153; 92/165 R
(58) Field of Search ...................... 92/140, 153, 165 R, 92/165 PR; 384/7, 11

(56) References Cited

U.S. PATENT DOCUMENTS

| | | | | |
|---|---|---|---|---|
| 11,549 | A | * | 8/1854 | Ellis ............................. 92/140 X |
| 584,592 | A | * | 6/1897 | Johnson ............................. 92/140 |
| 928,234 | A | * | 7/1909 | Myers ............................. 92/140 |
| 930,405 | A | * | 8/1909 | Myers ............................. 92/140 |
| 936,359 | A | * | 10/1909 | Rayner ............................. 92/140 |
| 1,436,915 | A | * | 11/1922 | Shoemaker ................... 384/11 |
| 1,668,976 | A | * | 5/1928 | Peet et al. ..................... 384/11 |
| 1,913,225 | A | * | 6/1933 | Young ....................... 92/140 X |
| 2,740,382 | A | * | 4/1956 | Morgan ..................... 92/140 X |
| 2,951,471 | A | * | 9/1960 | Hill ........................... 92/140 X |
| 3,137,439 | A | * | 6/1964 | Hanny et al. ............. 92/153 X |
| 3,603,213 | A | * | 9/1971 | Tootle ................. 92/165 PR X |
| 3,994,539 | A | * | 11/1976 | Gottlieb ............. 92/165 PR X |
| 4,086,844 | A | * | 5/1978 | Homuth ..................... 92/168 X |
| 4,280,741 | A | * | 7/1981 | Stoll ......................... 92/168 X |
| 4,905,577 | A | | 3/1990 | Schneeweiss |
| 5,007,331 | A | * | 4/1991 | Greiner et al. ............. 92/165 R |
| 5,033,869 | A | | 7/1991 | Kingston et al. ............. 384/38 |
| 5,247,873 | A | | 9/1993 | Owens et al. |
| 5,413,031 | A | * | 5/1995 | Kohlmeyer ............... 92/165 R |
| 5,771,694 | A | | 6/1998 | Houtman et al. |

OTHER PUBLICATIONS

2' Stroke Type 6HHE–VE–3–3–3 Ethyl;lme Primary Compressors Ingersoll Rand Engine Process Compressor Division/029–30961/Painted Post Division (1974) pp (2) 1–17.
Compressors Type F6–H230116/ the Burkhardt Engineering Works Ltd./Dornachestrasse 210 CH–4002 Basle.

* cited by examiner

*Primary Examiner*—John E. Ryznic
(74) *Attorney, Agent, or Firm*—Paul E. Purwin

(57) ABSTRACT

A connecting rod assembly for connecting high pressure pumps to mechanical or hydraulic pump drives has been developed. This assembly comprises a crosshead incorporating a novel design which slides on two parallel tie-rods in order to ensure precise and stabile support for moving pump components attached to the crosshead. Further, the crosshead utilizes a single centrally located drive bearing of spherical design to eliminate any torques which could otherwise be translated into the driven equipment (pumps).

5 Claims, 2 Drawing Sheets

Machine Drawing of Crosshead Assembly

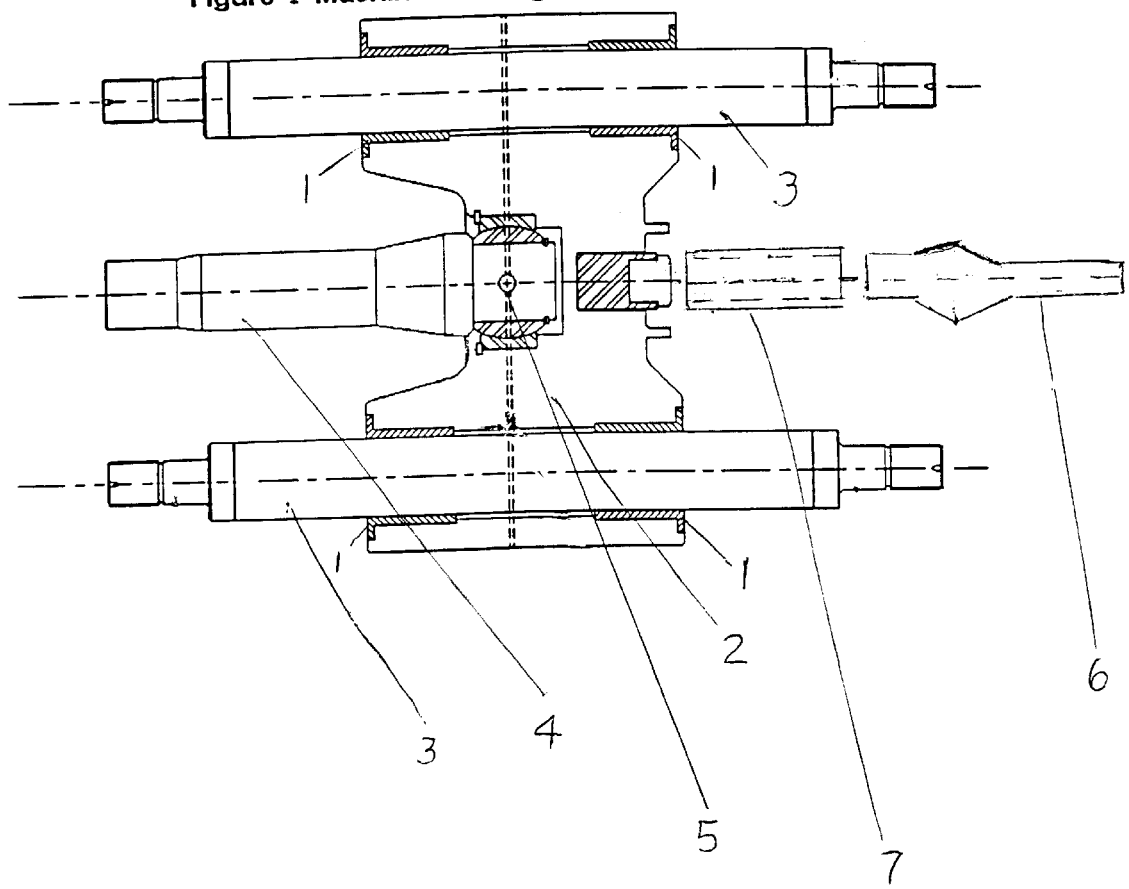

FIGURE 2 CROSSHEAD BUSHING

CONNECTING ROD ASSEMBLY FOR HIGH PRESSURE INJECTION PUMPS

This is an application under 35 USC §111 (a) of provisional application No. 60/061,141, filed on Oct. 6, 1997.

FIELD OF THE INVENTION

The invention relates to a connecting rod assembly for connecting high pressure pumps to mechanical or hydraulic pump drives.

BACKGROUND OF THE INVENTION

The present invention relates to the connecting rod assembly for connecting high pressure pumps to mechanical or hydraulic pump drives. These pumps are of the reciprocating type and are driven by power from an outside source like a diesel engine. The power end of the connecting rod assembly includes a crankshaft which is connected to a drive rod (often called a connecting rod) which articulates the motion of the crankshaft to a crosshead.

The crosshead, like a piston, creates a linear reciprocating motion derived from the motion of the crank shaft through the drive rod. The fluid end of the connecting rod assembly imports and pressurizes the fluid before it is expelled. The reciprocating motion of the crosshead is typically applied to a plunger and the plunger compresses fluid in the fluid end of the pump during the thrust portion of the pump cycle.

In most crosshead designs there are many moving parts which are subject to wear and tear. Most crossheads utilize "wrist pins" to allow oscillating motion of the drive rod relative to the crosshead about one axis only. Often, a cylindrical wrist pin bearing is employed between the wrist pin and the connecting rod to transmit reciprocating load to the crosshead.

Bearing wear accounts for most down time and repairs of fluid reciprocating pumps. Specifically, the wrist pin bearing between the connecting rod and the wrist pin becomes worn and deformed from the load transmitted during the thrust stroke of the pump when the plunger and crosshead are acting against high pressure fluid being pumped through the fluid end of the pump. As the wrist bearing wears, it creates "slop" between the connecting rod and the crosshead causing the pump to knock as it operates. Increasing the bearing size and surface results in longer bearing life. However, the result is an unacceptable increase in pump size and weight.

An additional problem with many bearing arrangements currently in use is misalignment of the drive rod with the crosshead. Misalignment causes the bearings to wear on one side rather than evenly. This uneven wear results in a further reduction of bearing life. A bearing arrangement which is self-aligning and will reduce uneven bearing wear is desirable.

Conventional crosshead designs are similar to pistons which reciprocate inside of a machine bore which is larger than the crosshead (See instructions, 12" Stroke Type 6HHE-VE-3-3-3 Ethylene Primary Compressors Ingersoll Rand Engine Process Compressor Division/029-30961/Painted Post Division (1974). Other crosshead designs incorporate flat or large radius curved crosshead slide plates sometimes referred to as "slippers" (See instructions, Compressors Type F6-H230116/the Burkhardt Engineering Works Ltd./Dornacherstrasse 210 CH-4002 Basle).

A variety of connecting rod assemblies which employ crossheads are found in the prior art. None of these connecting rod assemblies employs a single centrally located drive bearing of spherical design in the crosshead, as does the instant invention. U.S. Pat. No. 5,247,873 is directed to a connecting rod assembly having a crosshead wherein a ball and socket arrangement is employed to connect the connecting rod to the crosshead. Lubrication channels criss-cross the crosshead. In most connecting rod assemblies, a wrist pin is used to connect a crosshead to a connecting rod. In the invention of this patent, a wrist pin is not necessary.

U.S. Pat. No. 5,771,694 illustrates a crosshead system for a swashplate engine. A plurality of crossheads are constrained to move in a reciprocating fashion by traveling along a pair of parallel guide rods.

U.S. Pat. No. 5,033,869 discloses a linear slider with a floating bushing, formed from a block and two parallel shafts mounted through the block. The first shaft runs on coaxial bushings, while the second shaft runs in a single floating bushing. Lubrication channels may be present so that the floating bushing and shafts may be easily lubricated.

U.S. Pat. No. 4,905,577 illustrates a hydraulically operated piston machine which includes at least one cylinder and a piston axially movably guided in the cylinder. The piston is connected to a crankshaft by means of a connecting rod. The connecting rod and the piston each have spherically-shaped bearing surfaces for connecting the connecting rod and the piston with each other in an articulated manner.

BRIEF DESCRIPTION OF THE INVENTION

The crosshead design of the instant invention employs four bushings, preferably composed of sintered bronze, which slide on two parallel cylindrical rods, or tie rods. Each bushing is held in the crosshead via interference fit. This design is novel in that it places the contact points of the tie rod with the crosshead at the extreme outside location of the crosshead in order to minimize deviation of the crosshead's linear motion path in operation. Minimization of the motion path deviation results in more reliable operation of the attached pump components. The crosshead design of the instant invention also demonstrates novelty in the simplicity of the of the connection between the drive rod and the crosshead. Most crossheads utilize "wrist pins" to allow oscllating motion of the drive rod relative to the crosshead about one axis of rotation only. In this invention, a spherical bearing is used to connect the drive rod to the crosshead, the spherical bearing eliminates the problem of aligning the drive rod to the crosshead, since uniform clearances exist in the spherical bearing regardless of exact alignment within the range of motion of the spherical bearing. The spherical bearing allows rotation about all three coordinate axes. The spherical bearing and the four bushings are supplied lubricating oil via a flexible hose.

BRIEF DESCRIPTION OF THE FIGURES

FIG. 1 is a machine drawing of the crosshead assembly of the instant invention.

DESCRIPTION OF A PREFERRED EMBODIMENT

Figure 2A:
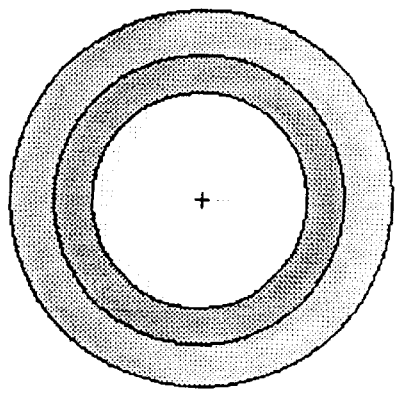
FIG. 2 illustrates a crosshead bushing, in cross section (FIG. 2A) and longitudinally (FIG. 2B), illustrating oil distribution grooves 11.
Figure 2B:
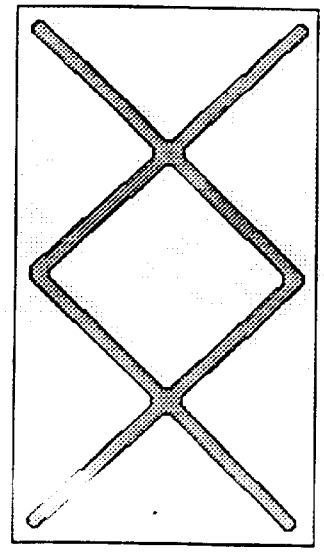

FIG. 1 is a machine drawing of the crosshead assembly of the instant invention. Each of the four bushings 1, held in the crosshead 2 by interference fit, slides along one of the two tie rods 3. The crosshead, 2 like a piston, creates a linear reciprocating motion derived from the motion of the crank shaft (not shown) through the drive rod 4. The drive rod 4 is aligned in the crosshead 2 by means of a spherical bearing 5. The fluid end of the connecting rod assembly imports and pressurizes the fluid before it is expelled. The reciprocating motion of the crosshead 2 is applied to a plunger 6, which is attached to the crosshead by means of a plunger connector 7. The plunger 6 compresses fluid in the fluid end of the pump (not shown) during the thrust portion of the pump cycle.

The preferred embodiment of the connecting rod assembly of this invention comprises a crosshead that is approximately 14 inches wide, 8 inches long, and 5.6 inches tall. This crosshead is designed to transmit a maximum force in the axial direction of approximately 5000 pounds. The 5000 pound force is required to move a pump plunger of 0.315 inch diameter against a maximum operating pressure of 65,000 psig (pump discharge pressure). The preferred material for construction of the crosshead assembly is gray cast iron, which is polymer coated for protection from corrosion. Each of the four bushings is preferably composed of sintered bronze. There are oil grooves in the surface of each bushing that contacts the tie rod, thereby permitting good oil distribution along the bushing surface so that it might slide along the tie rod without friction. The crosshead spherical bearing is preferably a 2 inch nominal size commercially available aircraft style rod-end bearing unit.

Data

The Table illustrates a test run to determine if a crosshead assembly of the design of the instant invention could operate effectively without occurrence of overheating and failure of the drive bearings in the power end of the crosshead assembly. Distilled water was used as the test medium in order to avoid volatility problems. A target discharge pressure of 44,000 psig was employed during the tests. The temperature of the gear box input shaft remained within acceptable limits, between 114 and 120 F as pump discharge pressure was varied. Although not illustrated on the Table, the pump discharge pressure was raised to 55,000 psig and there was no overheating or failure of drive bearings.

TABLE

Pump Test Log Sheet
(Entries over 6 Day periods)

| Entry | Day | Suction Pressure | Discharge Pressure | Water Drum Level | Oil Temp. | Motor Speed HZ | Temperature Gear Box Input Shaft |
|---|---|---|---|---|---|---|---|
| 1 | 1 | 92 | 40,000 | 20" | 89° F. | 25.2 | 117° F. |
| 2 | 1 | 92 | 40,000 | 17.6" | 89° F. | 25.2 | 116° F. |
| 3 | 1 | 92 | 44,000 | 19.1" | 89° F. | 25.2 | 118° F. |
| 4 | 1 | 92 | 43,500 | 16.75" | 90° F. | 25.2 | 120° F. |
| 5 | 1 | 92 | 43,000 | 18.40" | 90° F. | 25.2 | 120° F. |
| 6 | 1 | 90 | 42,000 | 17.40" | 90° F. | 25.2 | 118° F. |
| 7 | 2 | 90 | 45,000 | 17.50" | 87° F. | 25.2 | 115° F. |
| 8 | 2 | 90 | 43,000 | 19.50" | 90° F. | 25.2 | 120° F. |
| 9 | 3 | 90 | 44,000 | 19.50" | 87° F. | 25.2 | 115° F. |
| 10 | 6 | 90 | 42,000 | 12.80" | 86.8° F. | 25.2 | 114° F. |

What is claimed is:

1. A connecting rod assembly for connecting high pressure pumps to a mechanical or hydraulic pump drives comprising:

a crosshead having means for engaging a drive rod and a plunger wherein the crosshead has a pair of parallel guide bores therein, the guide bores having a first end, a second end and a middle;

a pair of parallel tie rods associated with and passing through the parallel guide bores;

a first and second bushing for each guide bore, the first bushings positioned within the first end of the guide bore and the second bushing positioned within the second end of the guide bore whereby the tie rods contact the crosshead only at the bushings.

2. The assembly of claim 1 wherein the bushings are held in the guide bore by interference fit.

3. The assembly of claim 2 wherein the bushings are composed of sintered bronze.

4. The assembly of claim 2 wherein the bushings have groves on the surface contacting the tie rods for even distribution of oil.

5. The assembly of claim 1 or 2 wherein the crosshead includes a spherical bearing for engaging a drive rod.

\* \* \* \* \*